Oct. 7, 1941.     G. WÜNSCH ET AL     2,257,927
THERMOELECTRIC SAFETY DEVICE
Original Filed Aug. 3, 1934
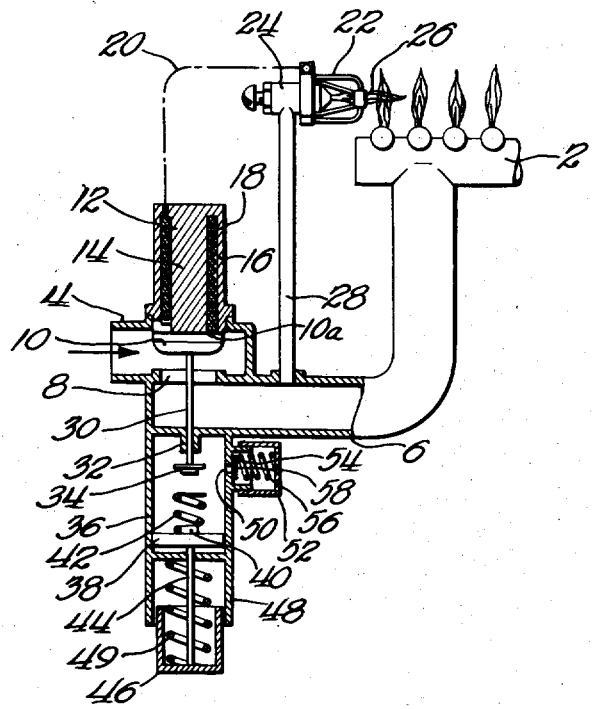
INVENTORS
Guido Wünsch
Josef Schuppert
BY
ATTORNEYS Patented Oct. 7, 1941

2,257,927

UNITED STATES PATENT OFFICE 2,257,927

THERMOELECTRIC SAFETY DEVICE

Guido Wünsch, Berlin-Steglitz, and Josef Schuppert, Dessau, Germany, assignors, by mesne assignments, to Junkers & Co., G. m. b. H., Dessau, Germany, a company of Germany Original application August 3, 1934, Serial No. 738,370. Divided and this application November 9, 1939, Serial No. 303,586. In Germany September 28, 1933

7 Claims. (Cl. 158—117.1)

This invention relates to an improvement in thermo-electric safety devices and the like.

The present application is a division of our co-pending application, Serial No. 738,370, filed August 3, 1934.

While the particular device which we shall describe in connection with the drawing is a thermoelectric safety valve, it is to be understood that the invention is not limited to use with this particular type of device but may be employed in connection with thermoelectric safety switches and all similar devices as suitable and desired.

Thermoelectric safety devices which have a valve or other controlling member, an electromagnet, and an armature which, when attracted, holds the controlling member in operative position and when retracted releases the controlling member for movement to safety position, require reset means for resetting the same.

These reset devices which move the armature to attracted position and the controlling member to operative position have had the objection of requiring the operator to hold the armature in attracted position and the valve, switch or other controlling member in operative position until the pilot or other burner, to the heat of which the thermocouple which is connected in circuit with the electromagnet is subjected, is lighted and, by the heat thereof on the thermocouple, has generated sufficient thermoelectric current to hold the armature in attracted position and the valve or other controlling member in operative position.

According to our invention we provide means which, upon completion of the resetting of the armature to attracted position and the valve or other controlling member to operative position, is operative to retard or delay movement of the armature to retracted position and movement of the valve or other controlling member to closed or safety position for a sufficient length of time to permit the pilot or other burner to be lighted and the heat of the flame thereof on the thermocouple to generate sufficient thermoelectric current to hold the armature in attracted position and the valve or other controlling member in open or operative position.

The chief advantage of our invention is in the ability to reset the thermoelectric safety device by merely actuating the reset means and without requiring the operator to hold the armature in attracted position and the controlling member in operative position for a period of time in the resetting operation.

Another advantage of our invention is in the form of the retarding or movement delaying means, and its disposition and correlation with respect to the reset means and with respect to the electromagnet, armature and valve or controlling member.

Other advantages and adaptations of the invention will be apparent from the following detailed description, taken in connection with the accompanying drawing, in which the single figure is a diagrammatic view, partly in section, of one illustrative embodiment of the invention.

In the following description the invention will be described in its application to heating apparatus, but it will be apparent to those skilled in the art that the broader aspects of the invention are applicable to other apparatus in which the use of a safety device of the character herein set forth is desired.

Referring to the drawing, the thermoelectric safety device is shown in its application to heating apparatus using gas as a heat generant. It is to be understood that any other fuel may be employed and that the heating apparatus may be of any suitable or preferred form, depending upon the requirements thereof.

The gas may be supplied from any suitable conventional source of supply (not shown) to a burner or burners 2 through a suitable passage herein comprising pipes 4 and 6 communicating through a valve seat opening 8 with which cooperates a valve or controlling member 10. Suitable igniting means, herein a pilot flame 26 issuing from a burner 24, is provided to ignite the gas or other fuel from the main burner 2. Controlling means for said valve is also provided, said controlling means being preferably heat responsive so as to be controllable by the pilot or other heating or igniting means. Herein the valve controlling means will preferably comprise an electromagnet and a thermocouple 22.

The electromagnet comprises a generally pot-shaped magnet 12 supported, for instance, by the upper wall of the pipe 4 and over the valve 10, which will be conveniently formed as an integral part of the armature 10a for the electromagnet. The magnet 12 is provided with an electromagnet winding or coil 18 and the combined valve and armature will preferably be made as light as possible. The core 14 and sleeve 16 of the magnet frame may be integral and will preferably be made of iron or an alloy having a very low capacity for residual magnetism. An iron alloy containing over 30% of nickel satisfies this condition.

The magnet winding 18 will preferably be made of relatively thick copper wire, 2 mm. or more in diameter. One end of said winding is conductively connected to the magnet frame while the other end is connected, preferably by a relatively thick copper wire 20, with one terminal of a thermocouple 22. The other terminal of the thermocouple is herein conductively connected to the burner 24 for maintaining the pilot flame 26, gas or other fuel being supplied to the burner 24 through a pipe 28 connected to the gas supply. The pipe 28 is herein conveniently connected to the pipe 6 between the valve seat 10 and the main burner 2. The terminal is thus conductively connected to the magnet frame through the walls of the pipes 28, 6 and 4.

The thermocouple 22 is so positioned relative to the pilot flame that the junctions or points of union thereof are heated by the pilot flame. One or more thermocouples may be used.

The valve stem 30 extends through a bearing 32 in the lower wall of the pipe 6 and carries a disc 34 at its free end. This disc 34 is contained in a cylinder 36 which also contains a piston 38. The piston 38 carries a central boss 40 supporting a helical spring 42 below the disc 34 and preferably out of contact with the disc 34 when the valve 10 is in open or operative position. The rod or stem 44 of the piston 38 extends through a transverse wall in the cylinder 36 and its outer end is connected to a plug or button 46 which has sliding fit in the cylindrical part 48. A helical spring 49 surrounds the stem 44, one end of this spring engaging the end of the plug or button 46 and the other end engaging the transverse or end wall of the cylinder 36, the spring 49 thus tending to press the piston 38 outwardly.

It will be apparent that by pressing inwardly upon the outer end of the button 46 the piston 38 will be moved inwardly and if the valve and armature forming member 10, 10a has dropped, continued pressure on the button 46 will move the armature 10a to attracted position and the valve portion 10 thereof to open position.

The damping or retarding means for delaying movement of the armature to retracted position and the valve to closed position for a sufficient length of time to permit the pilot or other burner to be lighted and the heat of the flame thereof on the thermocouple to generate sufficient thermoelectric current to hold the armature in attracted position and the valve or other controlling member in open or operative position, comprises a port 50 opening through the lateral wall of the cylinder 36 into a chamber 52. The chamber 52 contains a disc 54 and a helical spring 56 one end of which engages the disc 54 and the other end of which engages the opposite wall of the chamber 52 and thus tends to press the disc against the port 50 or into position closing the port. The disc 54 is provided with a small throttling or choke port 58, the entire dashpot combination forming a non-return or one way valve.

The operation of the illustrated embodiment of the invention is as follows:

The valve 10 being in open position, with the armature portion 10a thereof in attracted position against the magnet frame 12 as shown, it will be maintained in that position as long as the pilot 26 remains ignited, the thermoelectric current engendered by the heating of the thermocouple or thermocouples 22 by the pilot energizing the electromagnet. Gas or other fuel thus flows freely through the valve seat opening 8 to the burner 2 and is ignited by the pilot flame. Should the pilot 26 become extinguished for any reason the thermoelectric current will cease, or become insufficient to energize the electromagnet sufficiently to hold the valve 10 in open position and the valve will drop or be otherwise moved to closed position, closing the valve seat opening 8 and thereby shutting off the gas supply to the burner 2 and pilot 26.

To light the burner 2 the plug or button 46 is pressed inwardly in the cylinder part 48, thus moving the piston 38 inwardly. The air in the cylinder 36 being thus compressed the disc 54 will be raised or unseated from the port 50 against the tension of the spring 56 and air will thus escape from the cylinder 36 through the port 50. Before the piston 38 reaches its inwardmost position the spring 42 engages the disc 34 and actuates the valve and armature member 10, 10a outwardly, the armature portion into contact with the magnet frame 12 and the valve portion thereof into open position. In thus setting the valve and armature member to operative position the spring 42 is compressed so that when the armature is in attracted position and the valve in open position the spring 42 will be tensioned between the disc 34 and the piston 38.

The burner 2 and pilot being now supplied with gas, can be lighted. The pilot then heats the thermocouples 22, thus energizing the electromagnet which will then maintain the valve 10 open and the armature in attracted position as long as the pilot is lighted. The reset button or plug 46 may be released immediately following actuation of the valve and armature to operative position, and the spring 42 will continue to hold the valve in open position and the armature in contact with the magnet frame of the electromagnet until the latter becomes sufficiently energized to hold it there, for as previously exhausted air from the cylinder 36 can reenter the cylinder only very slowly through the throttling port 58 in the disc 54, the piston 38 can drop or move outwardly only very slowly. Consequently before the compressed spring 42 can expand sufficiently to allow retraction of the valve and armature 10, 10a, the thermoelectric current will have become sufficiently strong to hold the valve in open position. The pilot or other igniting or heating means and the thermocouple or thermocouples should be relatively positioned so that the thermal junction or junctions will be well and reliably heated.

The reset button 46 is mounted for reciprocatory movement coaxially with respect to the damping or retarding piston 38 and the button 46 and piston 38 are coaxial with respect to the electromagnet and the valve and armature. Moreover, the retarding means is normally free of the valve and armature, so that when the parts are positioned as shown in the drawing and the electromagnet is operative to hold the armature in attracted position, the electromagnet is not required also to hold the damping piston 38 in its inwardly projected position in the cylinder 36. With the parts positioned as shown in the drawing the electromagnet is also free of the spring 42. The damping means is out of the path of the fuel supply and is enclosed and sealed therefrom.

We do not intend to be limited to the precise details shown or described.

We claim:

1. In a safety device for fuel burners of the self-contained type employing thermoelectrical actuation, a passage through which the fuel flows to the burner, a valve in said passage, an electromagnet for normally holding said valve in open position and adapted to be energized by a thermocouple subjected to the heat of a flame in proximity to said burner, a cylinder closed against the entry of fuel into the same from said passage, a stem extending from the valve into said cylinder, reset means cooperable upon inward movement thereof with said stem to reset said valve to open position, and a piston carried by said reset means and operable in said cylinder to retard outward movement of said reset means and thereby closing movement of said valve and disconnected from said valve for outward movement free of said valve so that the electromagnet may hold said valve open without also holding said piston in its inward position.

2. In a safety device for fuel burners of the self-contained type employing thermoelectrical actuation, a passage through which fuel flows to the burner, a valve in said passage, an electromagnet for normally holding said valve in open position and adapted to be energized by a thermocouple subjected to the heat of a flame in proximity to said burner, a cylinder closed against the entry of fuel into the same from said passage, a stem extending from the valve into said cylinder, a piston operable in said cylinder to retard movement of said valve to closed position and disconnected from said valve for outward movement free of said valve, a reset stem extending from said piston and out of said cylinder, a reset button on said stem, and a spring interposed between the piston and the stem extending from the valve for resetting said valve to open position upon inward movement of said reset button.

3. In a safety device for fuel burners of the self-contained type employing thermoelectrical actuation, a passage through which fuel flows to the burner, a valve in said passage, an electromagnet for normally holding said valve in open position and adapted to be energized by a thermocouple subjected to the heat of a flame in proximity to said burner, a cylinder closed against the entry of fuel into the same from said passage, a stem extending from the valve into said cylinder, a piston operable in said cylinder to retard movement of said valve to closed position and disconnected from said valve for outward movement free of said valve, a reset stem extending from said piston and out of said cylinder, a reset button on said stem, a spring interposed between the piston and the stem extending from the valve for resetting said valve to open position upon inward movement of said reset button, and means for letting air out of said cylinder in the inward movement of the piston and for preventing the admission of air into said cylinder in the outward movement of the piston.

4. In a safety device for fuel burners, a passage through which fuel flows to the burner, a valve in said passage, a cylinder, a stem extending from the valve into said cylinder, a piston operable in said cylinder to retard movement of said valve to closed position and disconnected from said valve for outward movement free of said valve, a reset stem extending from said piston and out of said cylinder, a reset button on said stem, and means interposed between the piston and the stem extending from the valve for resetting said valve to open position upon inward movement of said reset button.

5. In combination, a thermally responsive safety device provided with thermally responsive means and with a controlling member having an operating position and a safety position, means for resetting said controlling member to operating position, and means adapted for actuation by said resetting means and at all times disconnected from and wholly free of said controlling member and said thermally responsive means for retarding movement of said controlling member to safety position upon resetting said controlling member to operating position.

6. In combination, a thermally responsive safety device provided with thermally responsive means and with a controlling member having an operating position and a safety position, means for resetting said controlling member to operating position, and means adapted for actuation by said resetting means and at all times disconnected from and wholly free of said controlling member and said thermally responsive means for retarding movement of said controlling member to safety position upon resetting said controlling member to operating position, said retarding means being carried by and operative with said resetting means.

7. In combination, a thermally responsive safety device provided with thermally responsive means and with a controlling member having an operating position and a safety position, means for resetting said controlling member to operating position, means adapted for actuation by said resetting means and at all times disconnected from and wholly free of said controlling member and said thermally responsive means for retarding movement of said controlling member to safety position upon resetting said controlling member to operating position, a stem extending from said controlling member, and a spring interposed between said stem and said retarding means.

GUIDO WÜNSCH.
JOSEF SCHUPPERT.